May 10, 1927.

E. ATTAWAY

RAFTER GAUGE

Filed April 17, 1923

1,628,447

INVENTOR
Elisha Attaway
BY James J. Sheehy & Co.
ATTORNEYS

Patented May 10, 1927.

1,628,447

UNITED STATES PATENT OFFICE.

ELISHA ATTAWAY, OF LOGANSPORT, LOUISIANA.

RAFTER GAUGE.

Application filed April 17, 1923. Serial No. 632,792.

My present invention pertains to scale finding instruments, and it contemplates the provision of a simple and inexpensive instrument through the medium of which the length of main and hip rafters may be readily and easily ascertained in proportion to each other.

I might state at this point that in measuring roofs for which my device is adapted, the first hypotenuse is considered the main rafter of a roof because it is readily apparent or first to be obtained while the second hypotenuse is the hip rafter because it is determined by measurements taken from the main rafter.

The invention further contemplates the provision of an instrument so constructed and arranged that the angles of roofs may be laid out in a very simple manner by any person even though they be unskilled in the art to which the instrument pertains.

The invention in all of its details will be fully understood from the following description and claim, when the same are read in connection with the drawings accompanying and forming part of this specification, in which:

Similar numerals of reference designate corresponding parts in all of the views of the drawings.

Figure 1:
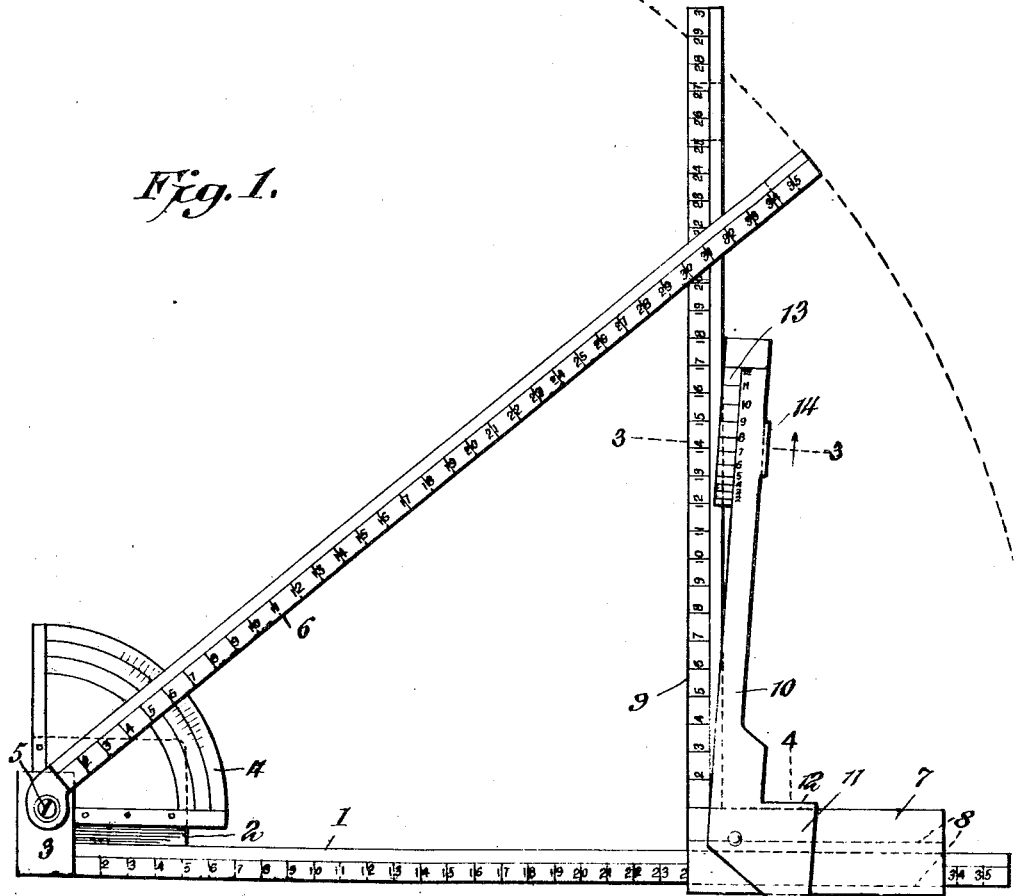
Figure 1 is a perspective view of the instrument comprising my invention.
Figure 2:
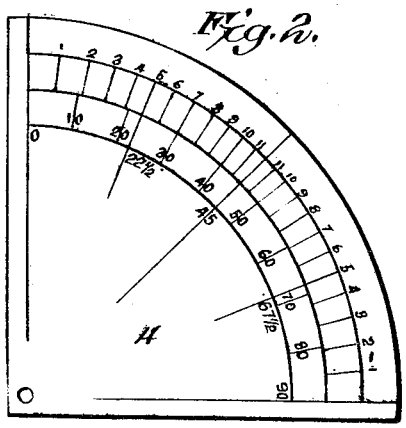
Figure 2 is a top plan view of the protractor plate of the device.

My novel instrument comprises the rule or arm 1, that is preferably, though not necessarily rectangular in cross-section, and said rule 1 is provided with a right angle portion 3 that rests upon and is secured to the base plate or portion 2, that in turn is superimposed on the protractor plate 4 that is marked off in degrees and as will be clearly manifest by reference to Figure 1 the plate 4 as well as portion 3 are adapted to receive a screw 5, for an important purpose hereinafter set forth.

Adapted to be swung on the pivot of the screw 5 is a rule 6 that is employed to indicate on plate 4 the angle of the hip or valley of the roof to be measured. Manifestly the rule 6 may be positioned at any degree with respect to the plate 4 and rule 1.

In Figure 1 I have shown my novel instrument as assembled, but I would distinctly have it understood that the various rules are readily adapted for immediate disengagement from each other for the purpose of storage.

The rule 9 of my device as shown is provided with markings and is further provided with a plate 7, having downwardly depending tongues 8 through the medium of which the rule 1 may be readily moved into such a position with respect to the tongues 8 so as to be engaged thereby and retained in proper relative position with respect to the rule 9.

Figure 3:
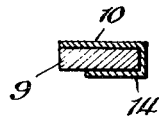
Figure 3 is a sectional view taken in the plate indicated by the line 3—3 of Figure 1 showing the arms in closed position and looking in the direction of the arrow.
Figure 4:
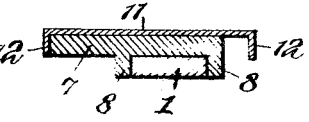
Figure 4 is an enlarged sectional view taken in the plane indicated by the line 4—4 of Figure 1, and looking in the direction of the arrow.

The short rule 10 is fulcrumed by means of a pin to the plate 7, and said rule is further provided with a lower extension 11 having the side portions 12, that are adapted to engage the plate 7 of the rule 9. The rule 10 is provided with an upper portion having the finger portion 14 and the body of the upper end of the rule 10 is adapted to partially surround the rule 9 as shown in Figure 3.

The rule 10 has also been provided with the graduations 13 as shown. It will be apparent that the rule 10 may be swung away from the rule 9, by simply exerting pressure on the plate 11, and the said rule may in turn be moved to snugly rest against the rule 9, by pressing against the portion 14 of said rule 10 and pushing said rule 10 against the rule 9.

In order to enable those skilled in the art to appreciate the working of my invention, I am giving herewith two examples of the operation of the device. We will suppose for example that a building is 24' wide and the roof thereof 5' high. It can be easily determined that the distance from the end of the building to the first main rafter should be one-half the width of the building or twelve feet. Of course it is presumed that the roof is provided with a hip and in using my novel instrument to determine the length of the hip rafter, the scale of 1' for 1" on my instrument is employed. In measuring this roof to determine the length of the hip rafter I merely stop the leg 9 at the graduations 12 on the leg 1 and then I line up the member 10 with the leg 9 and cross the leg 6 at 5 on the member 10 and then throw the member 10 out of position on the leg 9 and it will be seen that the length of the main rafter will be 13' and that the leg 6 will indicate the length of the hip rafter which is 17' 8½".

The graduations on the member 10 are provided in order to enable the operator to determine the incline he is working to. This incline is determined by merely crossing the leg 6 on any desired number on the member 10. If the leg 6 is crossed, for example, at the graduation 5 on member 10, the rafter will run at an incline of 5 on 13 as disclosed by my novel instrument. The number 5 on the member 10 is always coincident with 13 on member 9 and the angle of the roof or rafter is determined by the position the slide 7 is stopped on the bar 1. For instance, if the slide 7 is stopped on the bar 1 at 20 the angular position of the member 6 with respect to the member 10 if the member 6 is stopped at 5 will naturally be more severe than if the slide 7 is moved to the right to the point 30 and the member 6 is crossed on the member 10 at 5. In the latter case the angle of the bar 6 will not be as severe as in the first instance.

These graduations on the member 10 are obtained for a structure 24' in width by taking all main rafter lengths up to 45 degrees. By considering the following example the use of the protractor 4 and the graduations on the member 9 that are not included between 1 to 12 inclusive on member 10 will be understood. For example, 13' on the leg 9 is the main rafter length for a structure 24' in width with a roof 5' high. Graduations 5 to the left of 45 degrees on protractor 4 point off 67½ degrees which is the incline of said rafter in the roof. In order to explain the use of the graduations on member 9 that are not included from 1 to 12 on the member 10, I would state that O on member 10 is directly over 12 on leg 9; 5 on the member 10 is directly over 13 on leg 9; so therefore 12' is the center of a structure 24' in width and where the roof is 5' high on a structure, the length of the main rafter is 13'.

Graduations 2 to 12 on leg 9 are used as follows:

Cross leg 6 at 5 on member 10 and then move leg 9 back half way to the screw 5, leg 6 will then be across leg 9 at 6½ which is the main rafter length for a structure 12' in width having a roof 2' 6" high. Graduations 2 to 12 are also used for steeple measuring. For a tower 10' square with a roof 12' high, number 5 on leg 9 would be the center, while 5 on member 10 is over 13 on leg 9 which is the rafter length. Number 5 above 45 degrees on protractor 4 will be opposite 67½ degrees, which is the incline of the roof. The incline of the roof is given by corresponding figures on member 10 and outer graduations on protractor 4 and to illustrate we would take a roof with a 12 foot run and 5 foot rise. The operator would know to look below 45 degrees to read the given incline; five run and twelve rise the operator would look above 45 degrees to read the incline. Manifestly 5 below is opposite number 22½ while 5 above is opposite 67½ degrees, the total being 90. The leg 6 across member 10 will be over the degree that indicates the degree of angle of the hip rafter with respect to the main rafter and does not give the degrees of the incline of the roof.

Graduations 17 to 30 on leg 9 are used as follows:

Stop leg 9 at 12 on leg 1 and cross leg 6 at 5 on member 10 then move leg 9 along the leg 1 at 18. The leg 6 will be across leg 9 at 19½ which is the main rafter length for a structure 36' in width and 7' 6" high.

Member 10 starts at 12 on leg 9 and the term 5 on member 10 means that 5" is the height per foot on the main rafter, so where the structure is 28' in width, the roof would be 14 times 5" in height, which equals 5' 10".

Graduation 5 on member 10 is obtained as follows, by the angle across the square from 12 on one given line to 5 on the opposing given line, and likewise the scale on member 10 is obtained. After the calibration of member 10 is completed, I place leg 1 at right angles to leg 9 and member 10 so that leg 6 would measure the hip by crossing member 10. I use 5 for an example as it is the easiest to explain, but the entire scale is used likewise.

The leg 9 is used to measure from the side plate of the roof to the center thereof and to measure the main rafter and is the only element in my device that does such measuring.

Leg 1 is used to measure the difference from the corner of a structure to the first main rafter; said measurement equals half the width of the structure on a four hip roof.

The various graduations on the member 9 are provided in order to accomplish measurements of roofs of larger or smaller proportions.

Having described my invention, what I claim and desire to secure by Letters Patent is:—

In a measuring instrument, the combination of a plate having graduations marked thereon, a horizontal rule having graduations thereon and secured permanently at one side of the plate, a rule for determining angles in conjunction with the horizontal rule, means for pivotally securing the said rule to the plate, a vertical rule having graduations marked thereon, a base formed on the vertical rule and having a channel that is adapted to receive the horizontal rule whereby the vertical rule may be moved along the horizontal rule, and a fourth rule pivotally joined to the base of the vertical rule and having graduations on its upper end and further being provided with an upper portion that is adapted to partially surround a portion of the vertical rule.

In testimony whereof I have hereunto set my hand.

ELISHA ATTAWAY.